US010487984B2

(12) United States Patent
Oh et al.

(10) Patent No.: US 10,487,984 B2
(45) Date of Patent: Nov. 26, 2019

(54) REMOTE NATURAL GAS SUPPLY STATION USING LNG TANK CONTAINER AND METHOD FOR SUPPLYING NATURAL GAS USING THE SAME

(71) Applicant: Korea Gas Corporation, Seongnam-si, Gyeonggi-do (KR)

(72) Inventors: Young Sam Oh, Incheon (KR); Ki-Dong Kim, Incheon (KR); Seong Ho Hong, Gwacheon-si (KR); Jong-Mann Ha, Ansan-si (KR); Kyoung-Shik Choi, Ansan-si (KR); Hyoung Sik Kim, Uiwang-si (KR)

(73) Assignee: KOREA GAS CORPORATION, Seongnam-si (KR)

( * ) Notice: Subject to any disclaimer, the term of this patent is extended or adjusted under 35 U.S.C. 154(b) by 960 days.

(21) Appl. No.: 14/783,021

(22) PCT Filed: Nov. 28, 2013

(86) PCT No.: PCT/KR2013/010890
§ 371 (c)(1),
(2) Date: Oct. 7, 2015

(87) PCT Pub. No.: WO2014/168310
PCT Pub. Date: Oct. 16, 2014

(65) Prior Publication Data

US 2016/0053944 A1 Feb. 25, 2016

(30) Foreign Application Priority Data

Apr. 11, 2013 (KR) ........................ 10-2013-0039921

(51) Int. Cl.
*F17C 7/02* (2006.01)
*F17C 7/04* (2006.01)
(Continued)

(52) U.S. Cl.
CPC .................. *F17C 7/04* (2013.01); *F17C 7/02* (2013.01); *F17C 2201/0109* (2013.01);
(Continued)

(58) Field of Classification Search
CPC ...... F17C 7/02; F17C 7/04; F17C 2270/0171; F17C 2265/061; F17C 2201/054;
(Continued)

(56) References Cited

U.S. PATENT DOCUMENTS 2,044,673 A * 6/1936 Edwards .................. F17C 9/00 62/49.1
3,541,598 A * 11/1970 Dousset ............... B01J 37/0201 254/45
(Continued)

FOREIGN PATENT DOCUMENTS

AT 360 968 B 2/1981
CN 1213707 A 4/1999
(Continued)

OTHER PUBLICATIONS

International Search Report issued in corresponding application PCT/KR2013/010890, dated Mar. 6, 2014, pp. 1-5.
(Continued)

*Primary Examiner* — Frantz F Jules
*Assistant Examiner* — Erik Mendoza-Wilkenfel
(74) *Attorney, Agent, or Firm* — Brinks Gilson & Lione

(57) ABSTRACT

A natural gas supply station includes an installation structure on which an LNG tank container is installed and a gas vaporizer that receives a liquefied natural gas from the LNG tank container to vaporize the liquefied natural gas. The installation structure includes a moving part reciprocatively moving in a direction in which the LNG tank container is unloaded from a transport unit, and the moving part is separably fixed to the LNG tank container to move the LNG
(Continued)

tank container loaded on the transport unit to the installation structure or the LNG tank container loaded on the installation structure to the transport unit.

15 Claims, 7 Drawing Sheets

(51) Int. Cl.

| | |
|---|---|
| ***B61K 5/00*** | (2006.01) |
| ***B61K 7/16*** | (2006.01) |
| ***B65G 67/02*** | (2006.01) |
| ***B65G 67/24*** | (2006.01) |

(52) U.S. Cl.
CPC .. *F17C 2201/035* (2013.01); *F17C 2201/054* (2013.01); *F17C 2205/0107* (2013.01); *F17C 2265/061* (2013.01); *F17C 2270/0171* (2013.01)

(58) Field of Classification Search
CPC ........ F17C 2201/035; F17C 2201/0109; F17C 2205/0107; F17C 2270/0165; F17C 2270/0168; F17C 2270/0173; B61K 5/00; B61K 7/16; B65G 67/02; B65G 67/24
See application file for complete search history.

(56) References Cited

U.S. PATENT DOCUMENTS

| | | | | |
|---|---|---|---|---|
| 6,012,598 A * | 1/2000 | Antoniou | B65D 88/128 220/1.5 |
| 2003/0021743 A1* | 1/2003 | Wikstrom | B60L 11/1892 422/198 |
| 2009/0115190 A1 | 5/2009 | Devine | |
| 2010/0176124 A1 | 7/2010 | Gerding | |
| 2014/0069931 A1 | 3/2014 | Kim et al. | |

FOREIGN PATENT DOCUMENTS

| | | |
|---|---|---|
| CN | 1270639 A | 10/2000 |
| CN | 1623063 A | 6/2005 |
| CN | 1902107 A | 1/2007 |
| JP | 03-091251 U | 9/1991 |
| JP | H08508327 | 9/1996 |
| JP | H08337390 | 12/1996 |
| JP | 3015351 | 3/2000 |
| JP | 3091251 | 10/2002 |
| JP | 2006273569 | 10/2006 |
| KR | 20110062105 | 6/2011 |
| KR | 20120040049 | 4/2012 |
| KR | 2012 0084105 A | 7/2012 |
| RU | 15505 U1 | 10/2000 |
| WO | WO 2012/154015 A2 | 11/2012 |

OTHER PUBLICATIONS

European Search Report for corresponding European Application 13 88 1538, dated Mar. 8, 2016, 8 pgs.
Office Action issued for the corresponding Chinese Patent No. 2013800755096, dated Jun. 27, 2016.
European Office Action received in European Application No. 13 881 538.6-1760 dated Sep. 7, 2017.

* cited by examiner

REMOTE NATURAL GAS SUPPLY STATION USING LNG TANK CONTAINER AND METHOD FOR SUPPLYING NATURAL GAS USING THE SAME

CROSS-REFERENCE TO RELATED APPLICATIONS

This application a National Stage of International Application PCT/KR2013/010890 filed on Nov. 28, 2013, which the benefit of filing dates of Korean Patent Application No. 10-2013-0039921 filed on Apr. 11, 2013. The entirety of all applications is hereby incorporated by reference.

BACKGROUND

Field

The present invention relates to a remote natural gas supply station using a LNG tank container and a method for supplying natural gas using the same, and more particularly, to a natural gas supply station that is capable of more conveniently and safely supplying natural gas to a consumer in a remote area to which a natural gas piping network is not directly connected and a method for supplying the natural gas using the same.

Description of the Related Art

In general, there are two following methods for supplying natural gas to a consumer. First, there is a method for directly supplying the natural gas to the customer through a natural gas piping network. Second, there is a method for supplying liquefied natural gas (LNG) to the customer through a tank lorry. The second method is generally used when the natural gas is supplied to a remote area to which the natural gas piping network is not directly connected.

However, the second method has limitations in that a stationary storage tank needs to be separately installed in the remote area, and the stationary storage tank needs to be periodically filled with liquefied natural gas. That is, since the tank lorry may not be installed in the remote area so as to be used as a storage facility, the separate stationary storage tank that is distinguished from the tank lorry needs to be separately installed in the remote area. In other words, to supply the natural gas to the remote area to which the natural gas piping network is not directly connected, the stationary storage tank (and necessary facilities) may be separately installed in the remote area, and then the stationary storage tank needs to be periodically filled with the liquefied natural gas.

As described above, in case of the second method, since the stationary storage tank is separately installed for each remote area and then periodically filled with the liquefied natural gas, it takes a long time to fill the liquefied natural gas, and also, the transportation and supply of the liquefied natural gas (or natural gas) cause a lot of inconvenience. Furthermore, the installation of the stationary storage tank requires a lot of costs. Also, while the liquefied natural gas is filled into the stationary storage tank, boil-off gas is generally generated due to external heat. The boil-off gas is usually discharged to the atmosphere. Thus, incase of the second method, the discharge of the boil-off gas may cause the loss of natural gas or the risk of fire.

SUMMARY

An aspect of the present invention provides a natural gas supply station using a LNG tank container, which is capable of more conveniently and safely supplying natural gas to a consumer in a remote area to which a natural gas piping network is not directly connected and a method for supplying the natural gas using the same.

According to an aspect of the present invention, there is provided a natural gas supply station including an installation structure on which an LNG tank container is installed and a gas vaporizer that receives a liquefied natural gas from the LNG tank container to vaporize the liquefied natural gas. Here, the installation structure includes a moving part reciprocatively moving in a direction in which the LNG tank container is unloaded from a transport unit, and the moving part is separably fixed to the LNG tank container to move the LNG tank container loaded on the transport unit to the installation structure or the LNG tank container loaded on the installation structure to the transport unit.

According to another aspect of the present invention, there is provided a method for supplying natural gas, the method including transporting a LNG tank container in which liquefied natural gas is stored to an installation structure disposed at a gas-consuming area through a transport unit, unloading the LNG tank container from the transport unit to the installation structure to install the LNG tank container on the installation structure, supplying the liquefied natural gas from the LNG tank container installed on the installation structure to a gas vaporizer, and vaporizing the liquefied natural gas through the gas vaporizer to supply the natural gas to a consumer. The installation structure comprises a moving part reciprocatively moving in a direction in which the LNG tank container is unloaded from the transport unit. The moving part is separably fixed to the LNG tank container to move the LNG tank container loaded on the transport unit to the installation structure or move the LNG tank container loaded on the installation structure to the transport unit.

In the natural gas supply station using the LNG tank container and the method for supplying the natural gas according to the present invention, the natural gas may be conveniently and directly supplied to the consumer in the remote area by only transporting the LNG tank container on the installation structure and installing the LNG tank container on the installation structure. Furthermore, since the LNG tank container is loaded from the transport unit to the installation structure in the sliding manner, the cost may be reduced, and the management may be easy.

DRAWINGS

DETAILED DESCRIPTION

Embodiments of the present invention will be described below in more detail with reference to the accompanying drawings. However, the present invention is not restricted or limited to the embodiments below.

Embodiment 1

Figure 1:
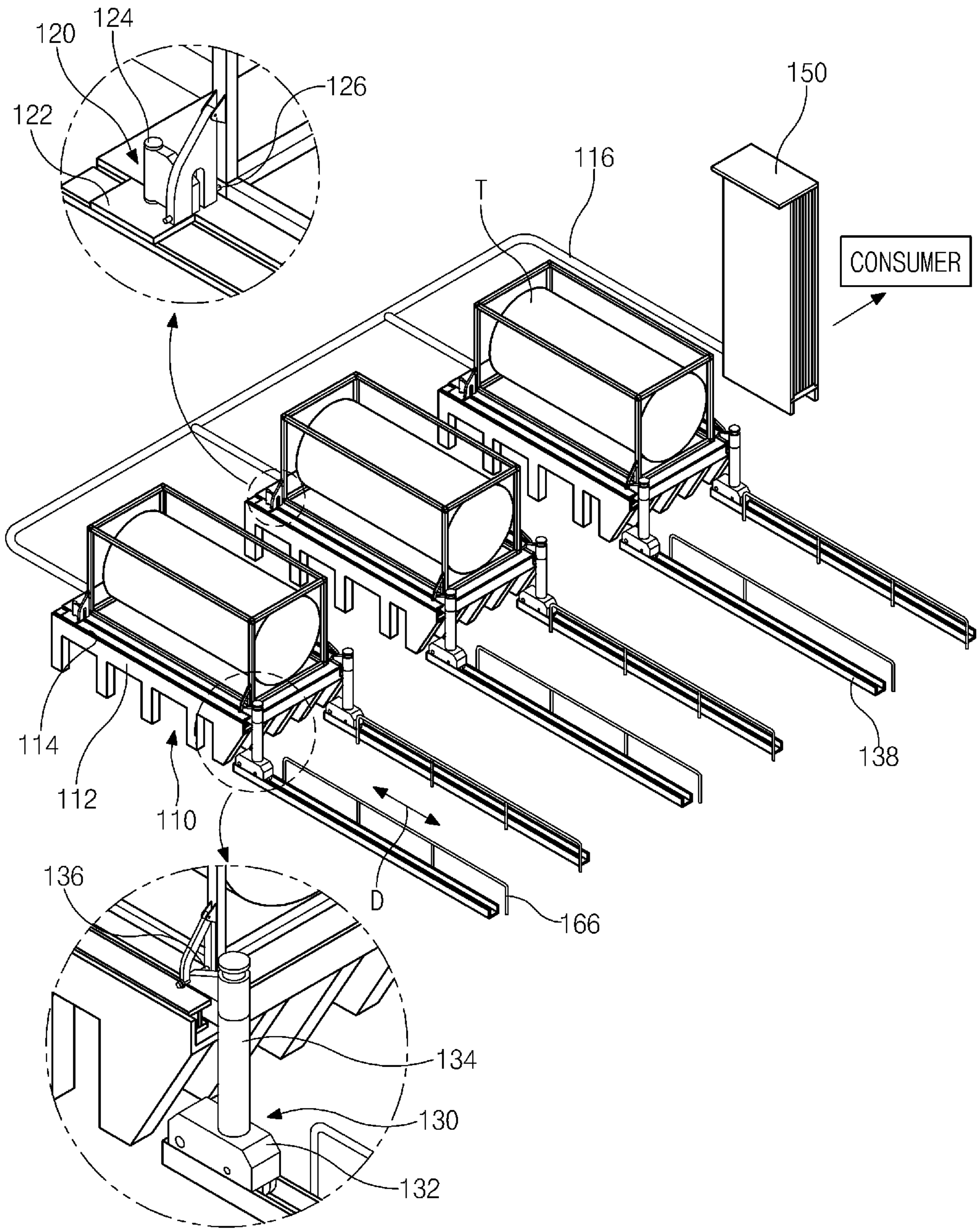
FIG. 1 is a perspective view illustrating a natural gas supply station according to Embodiment 1 of the present invention.

A natural gas supply station according to Embodiment 1 of the present invention has basic characteristics in that a LNG tank container in which liquefied natural gas is stored is provided and installed to directly supply the natural gas from the LNG tank container to a consumer. For this, the natural gas supply station according to Embodiment 1 of the present invention includes an installation structure 110 and a gas vaporizer 150 as illustrated in FIG. 1. For reference, FIG. 1 is a perspective view illustrating the natural gas supply station according to Embodiment 1 of the present invention.

First, the installation structure 110 will be described. In general, the installation structure 110 is a structure for installing the LNG tank container T in a remote area to which a piping network is not connected. That is, the installation structure 110 is a structure that is installed in the remote area to stably maintain the LNG tank container T. However, it is difficult to unload the LNG tank container T onto the installation structure 110. For example, a crane device may be used to unload the LNG tank container T. That is, the LNG tank container T may be unloaded from a transport unit V shown in FIG. 2 such as a trailer truck onto the installation structure 110 by using the crane device. However, the crane device generally requires a lot of costs, and management thereof is difficult.

To address the above-described unloading limitations, the natural gas supply station according to the present embodiment unloads the LNG tank container T from the transport unit V onto the installation structure 110 in a sliding manner. That is, the natural gas supply station according to the present embodiment pushes or pulls the LNG tank container T to unload or load the LNG tank container T between the transport unit V and the installation structure 110.

More specifically, the installation structure 110 of the natural gas supply station according to the present embodiment includes a moving part 120 to unload the LNG tank container T in the sliding manner. The moving part 120 reciprocatively moves in a direction D in which the LNG tank container T is unloaded (or unloaded and loaded) from the transport unit V. The moving part 120 is separably fixed to the LNG tank container T to move together with the LNG tank container T. That is, the moving part 120 is separably fixed to the LNG tank container T to move the LNG tank container T loaded on the transport unit V to the installation structure 110 or move the LNG tank container T loaded on the installation structure 110 to the transport unit V.

Also, the natural gas supply station according to the present embodiment includes a base part 112 installed on the ground to load the LNG tank container T and a guide part 114 disposed on the base part 112 to guide the moving part 120. The guide part 114 is a kind of groove. More specifically, the guide part 114 is a kind of groove in which the moving part 120 is inserted and guided. The guide part 114 is provided on the base part 112 in the direction D in which the LNG tank container T is unloaded (or unloaded and loaded) from the transport unit V. Thus, when the moving part 120 moves along the guide part 114, the LNG tank container T to which moving part 120 is coupled may move from the transport unit V to the base part 112 or from the base part 112 to the transport unit V.

However, the LNG tank container T is generally very heavy. Thus, it is preferable that the LNG tank container T moves in a state in which the LNG tank container T is lifted than that in which the LNG tank container T moves as it is. For this, the moving part 120 according to the present embodiment includes a moving base 122 and a moving lifter 124 disposed on the moving base 122. The moving base 122 repeatedly moves along the guide part 114 in the direction D in which the LNG tank container T is unloaded. Also, the moving lifter 124 is separably fixed to the LNG tank container T to lift the LNG tank container T. Thus, the natural gas supply station according to the present embodiment may move the LNG tank container T through the moving base 122 in a state in which the LNG tank container T is lifted by the moving lifter 124. For reference, the moving lifter 124 may be realized as a hydraulic device. A lifter 134 that will be described later is the same.

Also, the LNG tank container T is generally very long. Thus, it is preferable that the LNG tank container T moves in a state in which both ends of the LNG tank container T in a longitudinal direction are held than that in which only one end of the LNG tank container T is held. For this, the installation structure 110 according to the present embodiment further includes a support part 130. The support part 130 is separably fixed to the LNG tank container T to move together with the moving part 120 according to the movement of the moving part 120 while supporting the LNG tank container T. For reference, 20 ft and 40 ft type LNG tank containers T are generally used. All of the 20 ft and 40 ft type LNG tank containers T may be used in the present embodiment.

More specifically, (when the LNG tank container is still loaded on the transport unit) the moving part 120 is fixed to an end of the LNG tank container T, which is disposed adjacent from the installation structure 110 in the direction D in which the LNG tank container T is unloaded from the transport unit V, and the support part 130 is fixed to an end of the LNG tank container T, which is disposed away from the installation structure 110 in the direction D in which the LNG tank container T is unloaded from the transport unit V. As described above, when the moving part 120 moves in the state in which the moving part 120 holds the rear end of the LNG tank container T, and the support part 130 holds the front end of the LNG tank container T, the LNG tank container may be more stably unloaded.

Here, the support part 130 may lift the LNG tank container T. That is, when the moving part 120 coupled to the LNG tank container moves in the state in which the moving part 120 and the support part 130 lift the LNG tank container T to the same height, the LNG tank container T may more stably move. For this, the support part 130 according to the present embodiment includes a support base 132 and a support lifter 134 disposed on the support base 132. The support base 132 moves together with the moving part 120 according to movement of the moving part 120. Also, the support lifter 134 is separably fixed to the LNG tank container T to lift the LNG tank container T.

For reference, the LNG tank container T moves by the moving part 120 in the present embodiment. That is, force for moving the LNG tank container T is generated from the moving part 120 in the present embodiment. For this, the installation structure 110 may include a power unit such as a motor for moving the moving part 120. On the other hand, the support part 130 only supports the LNG tank container T. That is, the support part 130 does not move by oneself. When the moving part 120 pulls the LNG tank container T, the support part 130 only moves together with the LNG tank container T. However, the natural gas supply station according to the present embodiment is not limited to the above-described structure. For example, power may be applied to the support part 130 to move the support part 130 through the movement of the support part 130.

However, the natural gas supply station according to the present embodiment finally supplies the natural gas to the consumer. Thus, the natural gas supply station according to the present embodiment needs to vaporize the liquefied natural gas. For this, the natural gas supply station according to the present embodiment includes a gas vaporizer 150 that receives the liquefied natural gas from the LNG tank container T to vaporize the liquefied natural gas. For reference, the natural gas supply station according to the present embodiment may include a plurality of installation structures 110. Although the plurality of installation structures 110 are provided to install a plurality of LNG tank containers T, only one gas vaporizer 150 may be provided. This is done because it is sufficient so long as one gas vaporizer 150 is connected to the plurality of LNG tank containers T through a pipe 116.

Alternatively, unlike the present embodiment, the gas vaporizer may be installed directly on the base part of the installation structure. In this case, the installation structure (the base part) may share a function for supplying the natural gas by oneself. That is, when the LNG tank container is loaded on the base part and then connected to the gas vaporizer installed on the base part, the natural gas may be supplied directly from the installation structure (the base part) to the user in a gas-consuming area. (In addition, necessary constituents for supplying the natural gas, e.g., a pressure regulator for constantly maintaining a supply pressure of the natural gas may be further installed on the base part.) In other words, the installation structure in itself may be one natural gas supply station.

Here, it is desirable to transport the base part of the installation structure together with the gas vaporizer to the gas-consuming area (the destination). When the transport is possible, the natural gas supply station may be very easily installed in the remote area to which the natural gas piping network is not directly connected by only transporting the installation structure (the base part) in which the gas vaporizer is installed up to the gas-consuming area and installing the installation structure on the gas-consuming area. That is, the natural gas supply station may be provided as one set, and then the one set of natural gas supply station is transported up to the destination and installed at the destination. Thus, the natural gas supply station may be very easily installed at a desired place.

Figure 2:
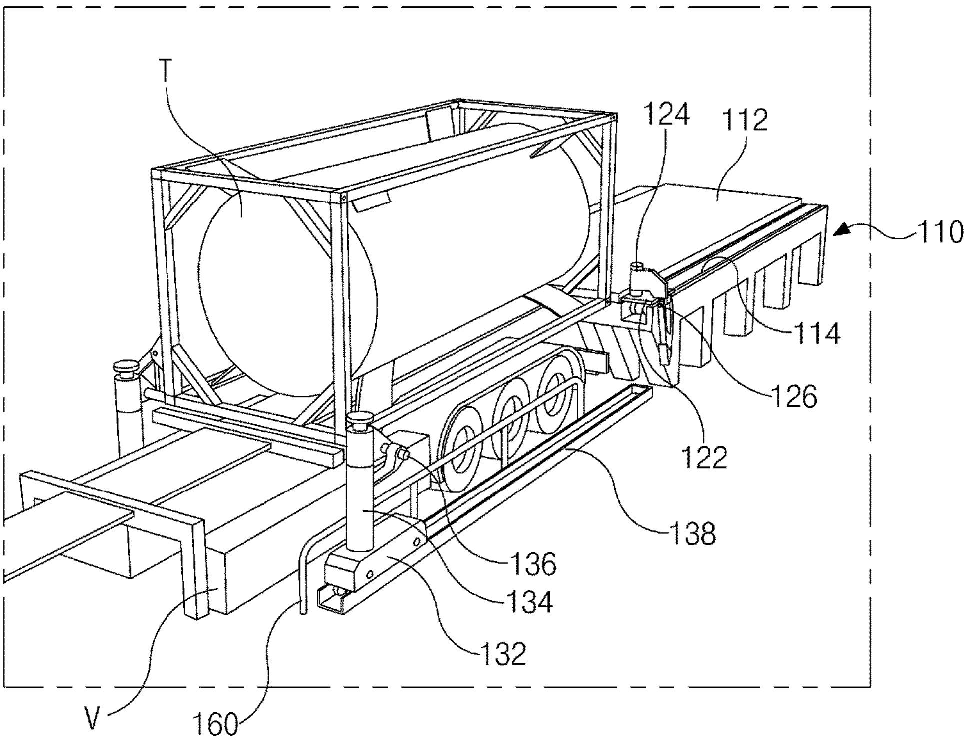
FIGS. 2 to 5 are perspective views for explaining an operation of the natural gas supply station of FIG. 1.
Figure 3:
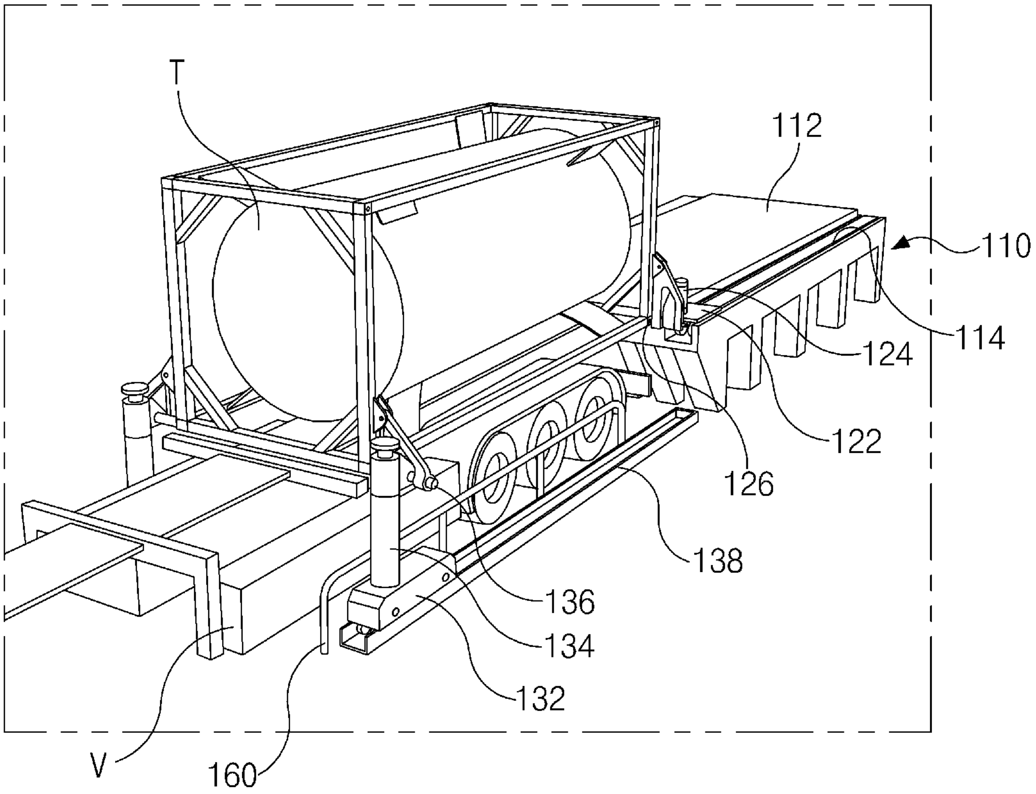

Hereinafter, an operation of the natural gas supply station according to the present embodiment will be described with reference to FIGS. 2 to 5. First, the LNG tank container T is transported to the installation structure 110 through the transport unit V such as the trailer truck. Next, as illustrated in FIG. 2, the trailer truck V moves backward to the installation structure 110. Here, the backward movement of the trailer truck V may be guided by a guide 160. Then, as illustrated in FIG. 3, the moving part 120 is fixed to a rear side of the LNG tank container T, and the support part 130 is fixed to a front side of the LNG tank container T.

Here, a hole defined in the LNG tank container T is used to fix the moving part 120 and the support part 130. In more detail, a predetermined hole for fixing is preprocessed in the LNG tank container T. The LNG tank container T is generally fixed by inserting a pin into the above-described hole. The natural gas supply station according to the present embodiment fixes the LNG tank container T by using such a hole. That is, the natural gas supply station according to the present embodiment respectively inserts a pin 126 disposed on the lifter 124 of the moving part 120 and a pin 136 disposed on the lifter 134 of the support part 130 into the holes of the LNG tank container T to fix the moving part 120 and the support part 130 to the LNG tank container T.

Figure 4:
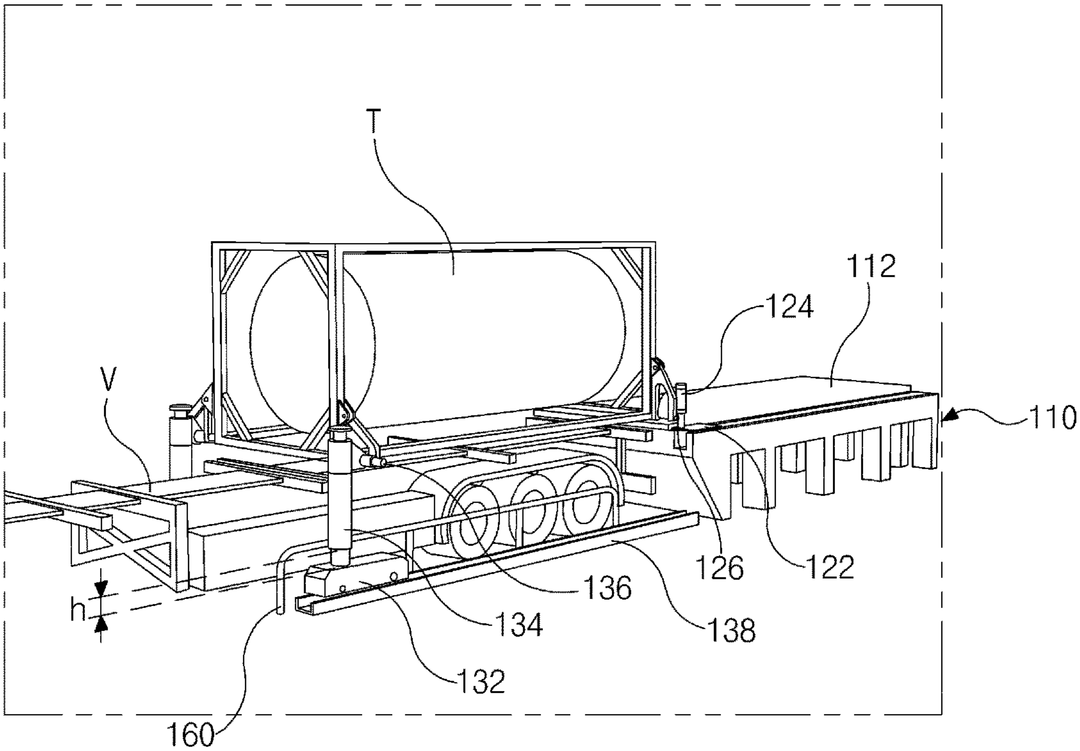
Figure 5:
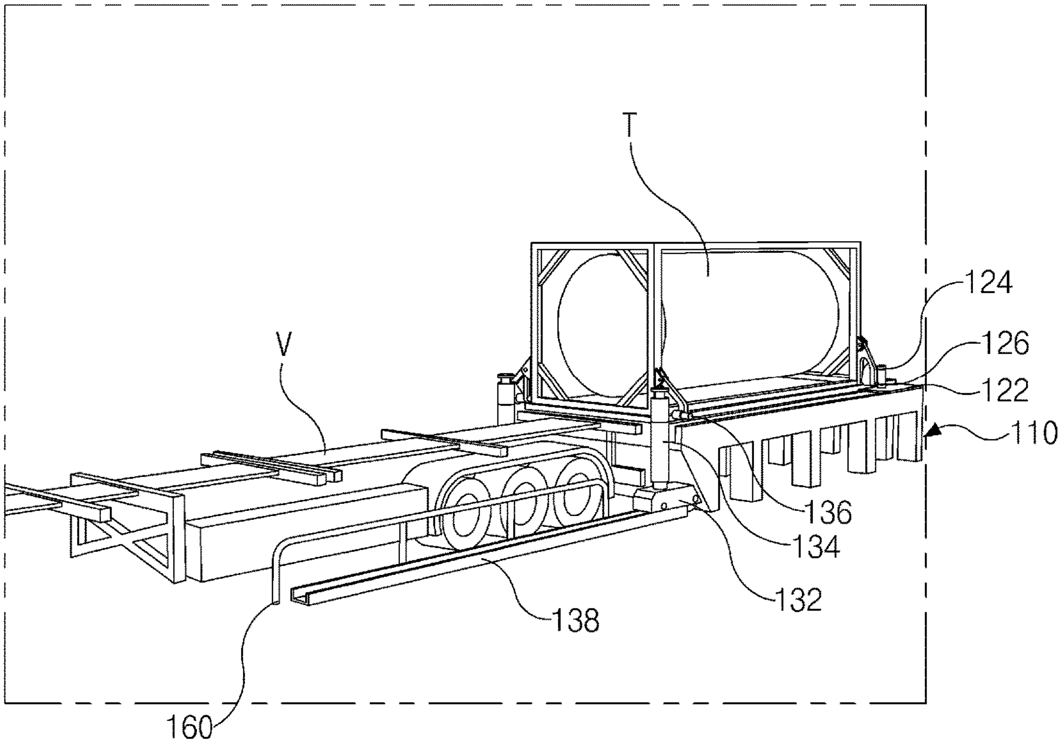

Then, as illustrated in FIG. 4, the lifter 124 of the moving part 120 and the lifter 134 of the support part 130 are driven to lift the LNG tank container T to a predetermined height h. Then, the LNG tank container T is pulled to the base 122 of the moving part 120 to install the LNG tank container T on the base part 112 of the installation structure 110 as illustrated in FIG. 5. In more detail, the LNG tank container T is pulled up to the base part 112 of the installation structure 110, and then the lifter 124 of the moving part 120 and the lifter 134 of the support part 130 are driven to seat the LNG tank container T on the base part 112 of the installation structure 110. Here, the movement of the base 122 of the moving part 120 is guided by the guide part 114 of the installation structure 110, and the movement of the base 132 of the support part 130 is guided by the guide 138.

The LNG tank container T is connected to the gas vaporizer 150 through the pipe 116. Then, the liquefied natural gas is supplied from the LNG tank container T to the gas vaporizer 150 according to user's demand. Thereafter, the liquefied natural gas is vaporized through the gas vaporizer 150 and then supplied to the consumer. Finally, when the liquefied natural gas is fully exhausted from the LNG tank container T, the LNG tank container T is loaded onto the transport unit V from the installation structure 110 in a process that is reverse to the unloading process in which the LNG tank container T is unloaded from the transport unit V to the installation structure 110. The natural gas supply station according to the present embodiment may continuously supply the natural gas to the consumer in the remote area by only unloading and loading of the LNG tank container T through a series of processes as described above.

The natural gas supply station according to the present embodiment may more conveniently supply the natural gas to the consumer in the remote area to which the natural gas piping network is not connected. That is, when the natural gas supply station according to the present embodiment is installed in the remote area to which the natural gas piping network is not connected, the natural gas may be conveniently supplied to the consumer in the remote area by only transporting the LNG tank container T up to the installation structure 110 and installing the LNG tank container T on the installation structure 110.

Also, in the natural gas supply station according to the present embodiment, since the LNG tank container Tin itself serves as a storage facility, it is unnecessary to install a separate stationary tank in the remote area. For example, the natural gas supply station according to the present embodiment uses the LNG tank container T that is manufactured based on a specific standard according to the related regulation like the ISO tank. The LNG tank container T in itself may be used as the storage facility. Thus, the natural gas supply station according to the present embodiment does not need to install the separate stationary tank. In other words, the natural gas may be supplied directly to the consumer in the remote area by only installing the LNG tank container T on the installation structure 110.

In addition, since the natural gas supply station according to the present embodiment does not fill the liquefied natural gas into the storage facility in the remote area using the tank lorry according to the related art, there is no possibility of danger or loss caused by the filling. That is, while the tank lorry according to the related art only transports the liquefied natural gas to the gas-consuming area, since the LNG tank container T according to the present embodiment not only transports the liquefied natural gas to the gas-consuming area, but also is installed on the installation structure 110 disposed on the gas-consuming area to participate in the supplying of the natural gas, the supply method according to the present embodiment is different from that according to the related art.

Furthermore, since the natural gas supply station according to the present embodiment unloads the LNG tank container T from the transport unit V onto the installation structure 110, the unloading costs may be reduced when compared to the case in which the crane device is used for unloading, and also the management may be easy.

Embodiment 2

Figure 6:
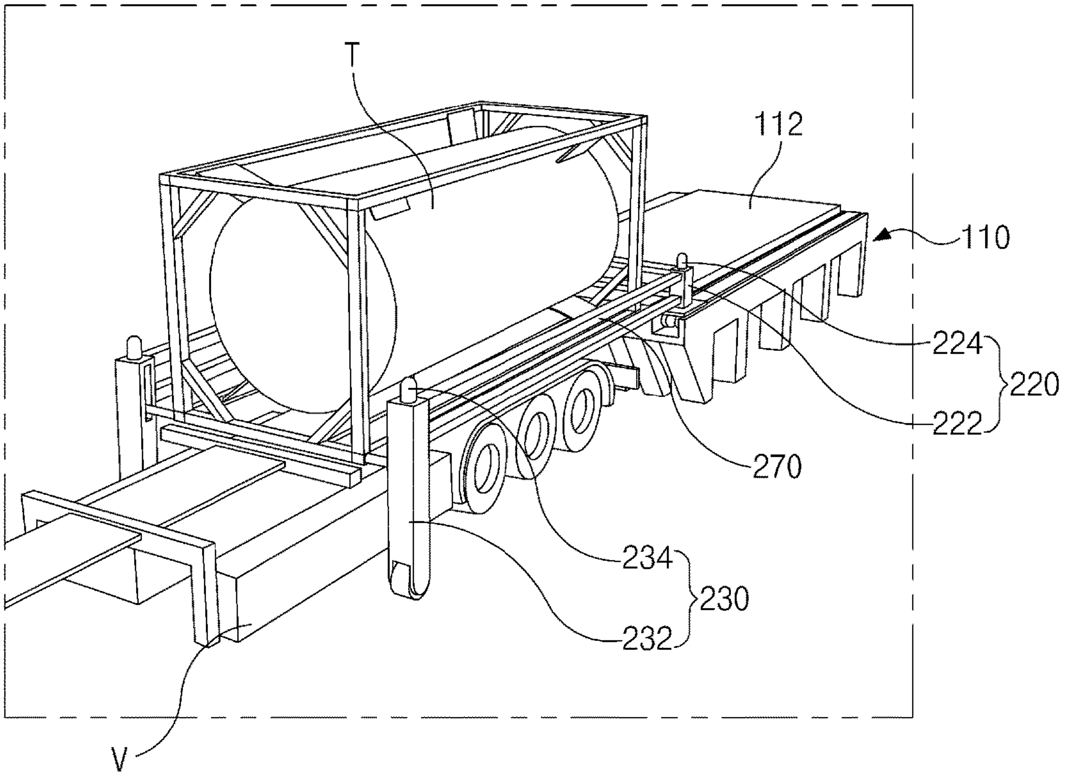
FIG. 6 is a perspective view illustrating a natural gas supply station according to Embodiment 2 of the present invention.
Figure 7:
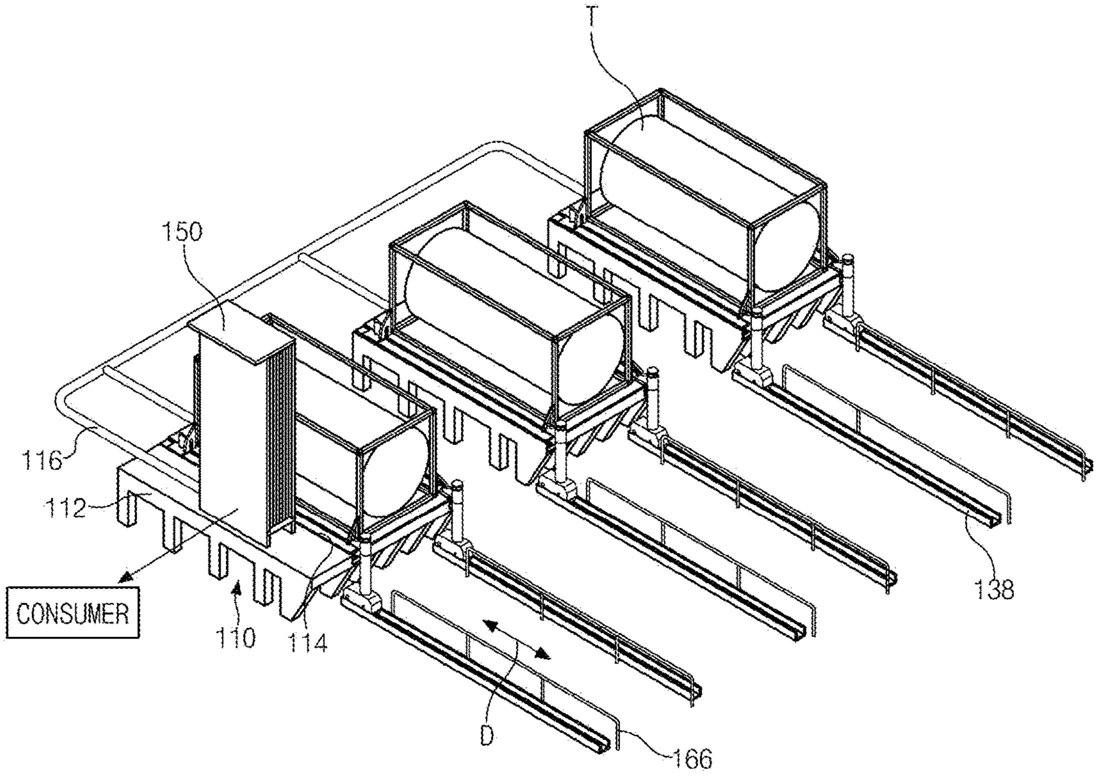
FIG. 7 is a perspective view of another example of Embodiment 1 showing the relationship of the gas vaporizer to the base section of the installation structure.

FIG. 6 is a perspective view illustrating a natural gas supply station according to Embodiment 2 of the present invention. As illustrated in FIG. 6, a natural gas supply station according to the present embodiment has constituents similar to those of the natural gas supply station according to Embodiment 1 of the present invention. However, the natural gas supply station according to the present embodiment is different from the natural gas supply station according to Embodiment 1 of the present invention in that a connection part that will be described later is provided. For reference, the same component as the component according to the foregoing embodiment is given by the same reference number, and thus, its detailed description will be omitted.

The natural gas supply station according to the present embodiment includes a moving part 220 and a support part 230, like the foregoing embodiment. In more detail, the moving part 220 includes a base 222 and a lifter 224. Also, the support part 230 also includes the base 232 and the lifter 234. Here, the moving part 220 is connected to the support part 230 through a connection part 270. That is, in the natural gas supply station according to the present embodiment, the moving part 220 and the support part 230 are integrated with each other by using the connection part 270 as a medium. When the moving part 220 and the support part 230 are integrated with each other, the moving part 220 and the support part may more stably move.

The present invention relates to the natural gas supply station using the LNG tank container that is capable of conveniently and safely supplying the natural gas more to the consumer in the remote area to which the natural gas piping network is not connected and the method for supplying the natural gas using the same, and thus, industrial availability is high.

What is claimed is:

1. A natural gas supply station comprising:

an installation structure comprising an elevated platform structure above a ground surface supporting a liquefied natural gas (LNG) tank container;

a loading and unloading assembly to facilitate loading and unloading of the LNG tank container from the installation structure, wherein the loading and unloading assembly comprises:

at least one moving part that moves along grooves formed on the platform structure which guide the at least one moving part to reciprocate on the installation structure in a first and second direction between a front end and a rear end of the installation structure, an at least one support part exterior to the installation structure, is coupled to the at least one moving part by a connection member, wherein the connection member comprises at least one longitudinal bar that moves together with the moving part, and wherein the at least one support part engages the LNG tank container to provide exterior support to the LNG tank container when the LNG tank container is moved away from the installation structure, wherein the at least one longitudinal bar within the connection member enables the at least one support part to move together with the at least one moving part during the loading and the unloading of the LNG tank container from the installation structure, and wherein the loading and unloading assembly enables the LNG tank container to move reciprocatively in the first direction when the LNG tank container is unloaded from a transport vehicle, and in the second direction when the LNG tank container is loaded to the transport vehicle; and a gas vaporizer coupled to the LNG tank container through a pipe to receive liquefied natural gas from the LNG tank container and to vaporize the liquefied natural gas prior to supply to consumer.

2. The natural gas supply station of claim 1, wherein the at least one moving part further comprises:

a moving lifter disposed on a moving base, the moving lifter being separably fixed to the LNG tank container in order to lift the LNG tank container.

3. The natural gas supply station of claim 1, wherein the at least one support part is configured to be separably fixed to the LNG tank container.

4. The natural gas supply station of claim 1, wherein the at least one support part comprises:

a support base which moves along a ground rail together with the at least one moving part; and a support lifter disposed on the support base, wherein the support lifter is separably fixed to the LNG tank container in order to lift the LNG tank container.

5. The natural gas supply station of claim 1, wherein the at least one moving part is configured to be separably fixed to one end of the LNG tank container, and the at least one support part is configured to be separably fixed to the other end of the LNG tank container.

6. The natural gas supply station of claim 1, further comprising:

a transport unit guide being an elevated guard rail disposed along a support part guide for guiding the transport unit to the installation structure, wherein the at least one support part guide being a ground rail guides the movement of the support part.

7. The natural gas supply station of claim 1, wherein the gas vaporizer is installed on the base part.

8. The natural gas supply station of claim 7, wherein the base part is transportable up to a gas-consuming area, and the gas vaporizer is transportable together with the base part up to the gas-consuming area.

9. The natural gas supply station of claim 1, wherein the LNG tank container comprises an ISO tank.

10. A method for supplying natural gas, the method comprising:

transporting a liquefied natural gas (LNG) tank container in which liquefied natural gas is stored to an installation structure disposed at a gas-consuming area through a transport vehicle, wherein the installation structure comprises an elevated platform structure above a ground surface supporting the LNG tank container;

unloading the LNG tank container from the transport vehicle to the installation structure through a loading and unloading assembly to facilitate installing of the LNG tank container on the installation structure, wherein the loading and unloading assembly comprises:

at least one moving part that moves along grooves formed on the platform structure which guide the at least one moving part to reciprocate on the installation structure in a first and second direction between a front end and a rear end of the installation structure, an at least one support part exterior to the installation structure, is coupled to the at least one moving part by a connection member, wherein the connection member comprises at least one longitudinal bar that moves together with the moving part, and, wherein the at least one support part engages the LNG tank container to provide exterior support to the LNG tank container when the LNG tank container is moved away from the installation structure, wherein the at least one longitudinal bar enables the at least one support part to move together with the at least one moving part during the loading and the unloading of the LNG tank container from the installation structure, and wherein the loading and unloading assembly enables the LNG tank container to move reciprocatively in the first direction when the LNG tank container is unloaded from a transport vehicle, and in the second direction when the LNG tank container is loaded to the transport vehicle;

supplying the liquefied natural gas from the LNG tank container installed on the installation structure to a gas vaporizer; and vaporizing the liquefied natural gas through the gas vaporizer to supply the natural gas to a consumer, wherein the gas vaporizer is coupled to the LNG tank through a pipe.

11. The method of claim 10, further comprising loading the LNG tank container from which the liquefied natural gas is fully exhausted to the transport vehicle through the loading and unloading assembly.

12. The method of claim 10, wherein the at least one moving part comprises:

a moving base reciprocatively moving in the first and second directions and a moving lifter disposed on the moving base, the moving lifter being separably fixed to the LNG tank container to lift the LNG tank container.

13. The method of claim 10, wherein the at least one support part is configured to be separably fixed to the LNG tank container.

14. The method of claim 10, wherein the at least one support part comprises:

a support base moving together with the at least one moving part; and a support lifter disposed on the support base, the support lifter being separably fixed to the LNG tank container to lift the LNG tank container.

15. The method of claim 10, wherein the LNG tank container comprises an ISO tank.

* * * * *